Nov. 18, 1969  K. PREECE  3,478,421

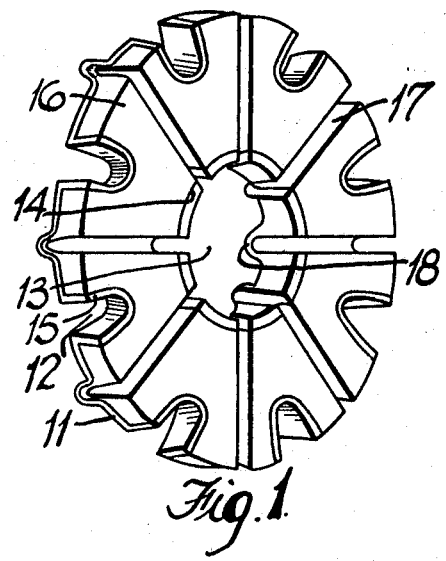
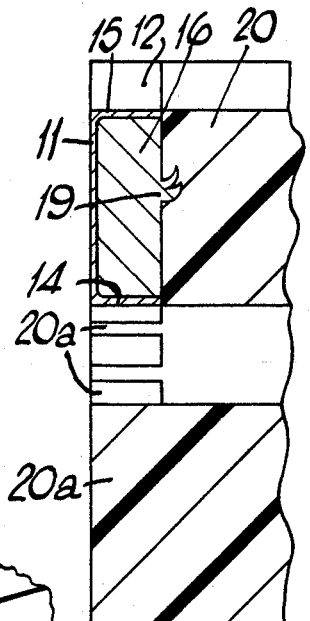
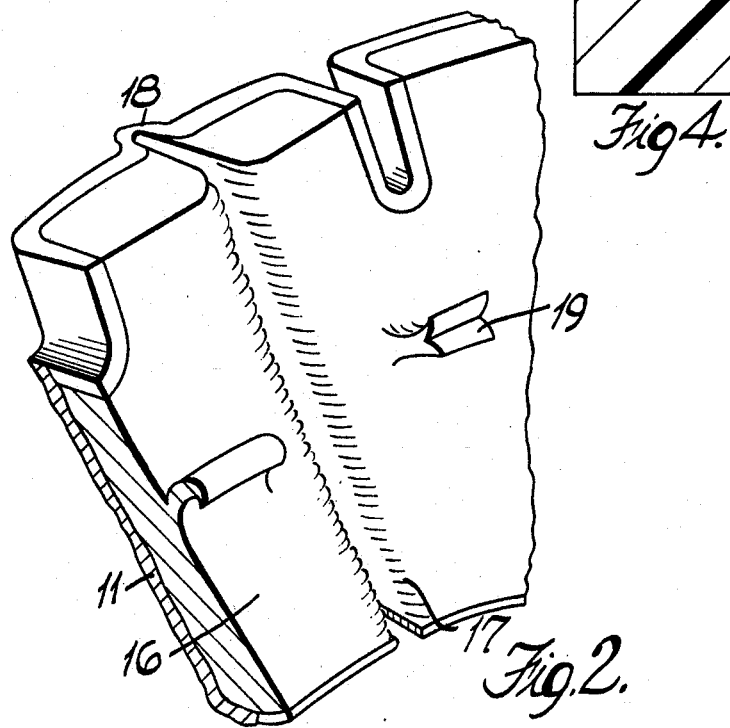

METHOD OF MANUFACTURING COMMUTATORS

Filed July 10, 1967  3 Sheets-Sheet 3

United States Patent Office 3,478,421
Patented Nov. 18, 1969

3,478,421
METHOD OF MANUFACTURING COMMUTATORS
Kenneth Preece, Solihull, England, assignor to Joseph Lucas (Industries) Limited, Birmingham, England
Filed July 10, 1967, Ser. No. 652,252
Claims priority, application Great Britain, July 20, 1966, 32,579/66
Int. Cl. H01r *43/00*
U.S. Cl. 29—597                          6 Claims

ABSTRACT OF THE DISCLOSURE

A commutator of a dynamo electric machine, wherein, each conductive segment of the commutator comprises a first portion which is formed from a first conductive material and which in use is engaged by the brushes of the dynamo electric machine, and a second portion supporting the first portion, and formed in a second material which in use constitutes a heat sink for the first portion.

---

This invention relates to commutators for dynamo electric machines and is particularly concerned with face commutators.

In a commutator according to the invention each conductive segment thereof comprises a first portion which is formed from a first conductive material and which in use is engaged by the brushes of the dynamo electric machine, and a second portion, supporting the first portion and formed in a second material which in use constitutes a heat sink for the first portion.

The term segments is used herein to include the conductive parts of the commutator on which the brushes of the dynamo electric machine run in dynamo electric machines having barrel or face commutators.

At present, commuators require a large amount of copper in their construction, only a small proportion of which is intended for contact with the brushes of the dynamo electric machines, the majority of the mass of the copper constituting a heat sink. By virtue of the construction defined in the last paragraph, the amount of copper can be reduced by forming the second portion from a cheaper material having the desired properties for example, aluminium.

Figure 3:
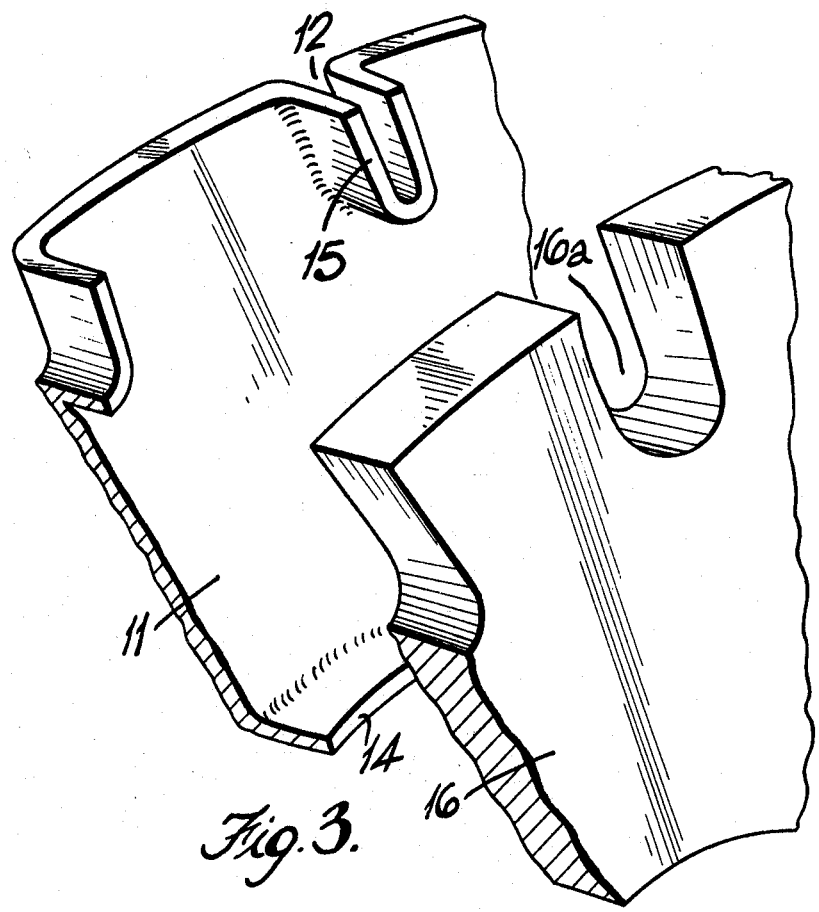
Figure 5:
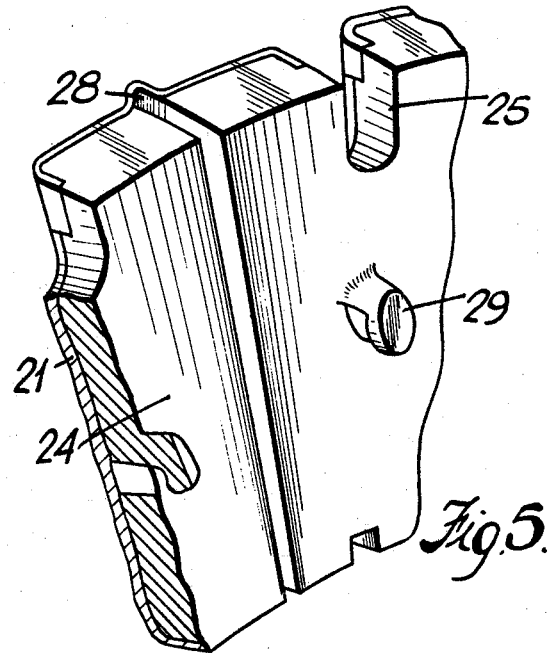
Figure 6:
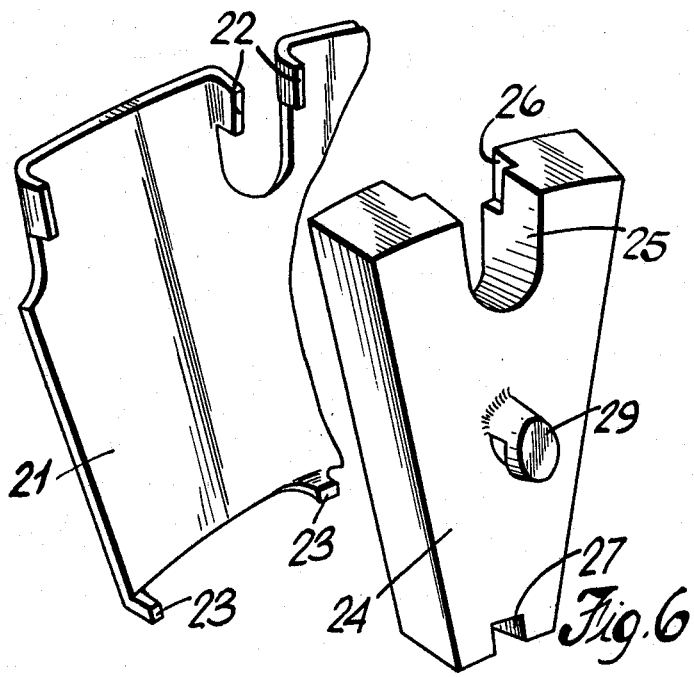

Two examples of the invention as applied to a face commutator are illustrated in the accompanying drawings wherein;

FIGURE 1 is a perspective view of a first example of a commutator during construction, FIGURE 2 is a fragmentary view similar to FIGURE 1 showing a later stage of construction, FIGURE 3 is a fragmentary perspective view showing the components of the commutator shown in FIGURE 1 prior to assembly, FIGURE 4 is a sectional view of the completed commutator shown during construction in FIGURE 1 and FIGURES 5 and 6 are view similar to FIGURES 2 and 3 respectively and illustrate a second example of the invention.

Referring to FIGURES 1 to 4, the commutator comprises an annular copper disc 11 which is provided around its periphery with a plurality of equiangularly spaced radially extending U shaped parts 15 defining grooves 12 extending parallel to the axis of the disc 11. The periphery of the central hole 13 of the disc 11 is formed with an axially extending flange 14. An annular aluminium disc 16 is engaged with the disc 11 and is provided with slots 16a for receiving the parts 15, the flange 14 being received in the central hole in the disc 16.

The assembly is now stamped to produce a plurality of radially disposed grooves 17 which extend through the thickness of the disc 16 and define corresponding ribs 18 on the exposed face of the disc 11. The grooves 17 define between them the segments of the commutator, each segment containing one of the grooves 12. The stamping process serves also to bond the disc 11 to the disc 16.

The aluminium part of each segment is now shaped to provide lugs 19 (FIG. 2). The assembly is placed in a mould and a synthetic resin material in liquid form is poured into the mould. When the synthetic resin material sets it constitutes a support body 20 for the assembly, the lugs 19 being firmly anchored in the resin body. The assembly is now machined to remove the ribs 18 thereby separating the segments from each other, each segment being supported on the resin body by virtue of its lugs 19, and being separated from its adjacent segments by a portion 20a of the body 20. It will be appreciated that since the disc 11 was bonded by the stamping operation to the disc 16, the segments of the disc 11 will be adequately supported on the segments of the disc 16. Finally the resin body is secured to a dynamo electric machine and the required electrical connections of the windings of the machine are made to the parts 15 of the segments of the commutator, the parts 15 of the segments being of sufficient length to support the ends of the connecting leads during the connecting operation.

In use, the copper disc 11 is engaged by the brushes of the machine while the aluminium disc 16 constitutes the heat sink.

Referring now to FIGURES 5 and 6 there is provided a copper disc 21 similar to the disc 11 in the previous example. The disc 21 is provided with lugs 22 in place of the parts 15 associated with the disc 11 and has further lugs 23 which extend parallel with lugs 22 from the central hole of the disc 21. A plurality of sintered iron segments 24 are engaged with the disc 21 in spaced relationship, each segment 24 having a U shaped slot 25 the sides of which have depressions 26 with which the lugs 22 engage. The segments are further provided with grooves 27 which engage with the lugs 23 and the faces of the segments which engage the disc 21 are coated with a brazing compound.

The assembly is placed in a brazing furnace and heated to braze the segments 24 to the disc 21. A tool is now inserted between the segments 24 and the disc 21 is stamped to define a plurality of radial ribs 28 which correspond to the ribs 18 in the previous example. The assembly is now formed with a synthetic resin support body and is machined in exactly the same manner as in the previous example the segments 24 being provided with lugs 29 which constitute anchorages for the support body.

Having thus described my invention what I claim as new and desire to secure by Letters Patent is:

1. A method of manufacturing a face commutator for a dynamo electric machine, comprising the steps of engaging a first annular disc of an electrically conductive, first material in facial contact with a second annular disc of a thermally conductive second material so that the discs are coaxial, subjecting the assembly to a stamping operation to form in the second disc a plurality of radially extending grooves of greater depth than the thickness of the second disc so that corresponding ribs are formed on the surface of the first disc, moulding an insulating body onto the second disc so that the grooves are filled with insulating material and then machining the surface of the first disc to remove the ribs so that the assembly is divided into segments spaced apart by portions of the insulating body.

2. A method as claimed in claim 1 including the step of forming a plurality of projections on the face of the second disc which form a key in use between each segment and the moulded body.

3. A method of manufacturing a commutator for a dynamo electric machine comprising the steps of securing to an annular disc of an electrically conductive first material, a plurality of segmental members of a thermally conductive second material in such a manner that the members define an annulus but are spaced from one another to define radially extending slots, stamping the disc to form on the surface thereof a plurality of ribs corresponding with the slots between said members, moulding an insulating body around said members so that said slots are filled with insulating material and then machining the surface of the disc to remove said ribs so that the disc is divided into segmental portions each of which is supported on one of said members and is separated from its adjacent portions by a portion of the insulating body.

4. A method as claimed in claim 3 wherein said members are secured to the disc by brazing.

5. A method as claimed in claim 1 wherein the first material is copper and the second material is aluminium.

6. A method as claimed in claim 3 wherein the first material is copper and the second material is sintered iron.

References Cited

UNITED STATES PATENTS

| | | | |
|---|---|---|---|
| 842,829 | 1/1907 | Duncan | 29—597 |
| 2,400,590 | 5/1946 | Meyerhoeffer | 29—597 |
| 2,427,517 | 9/1947 | Wilson et al. | |

JOHN F. CAMPBELL, Primary Examiner

C. E. HALL, Assistant Examiner.

U.S. Cl. X.R.

310—237